Figure 1:
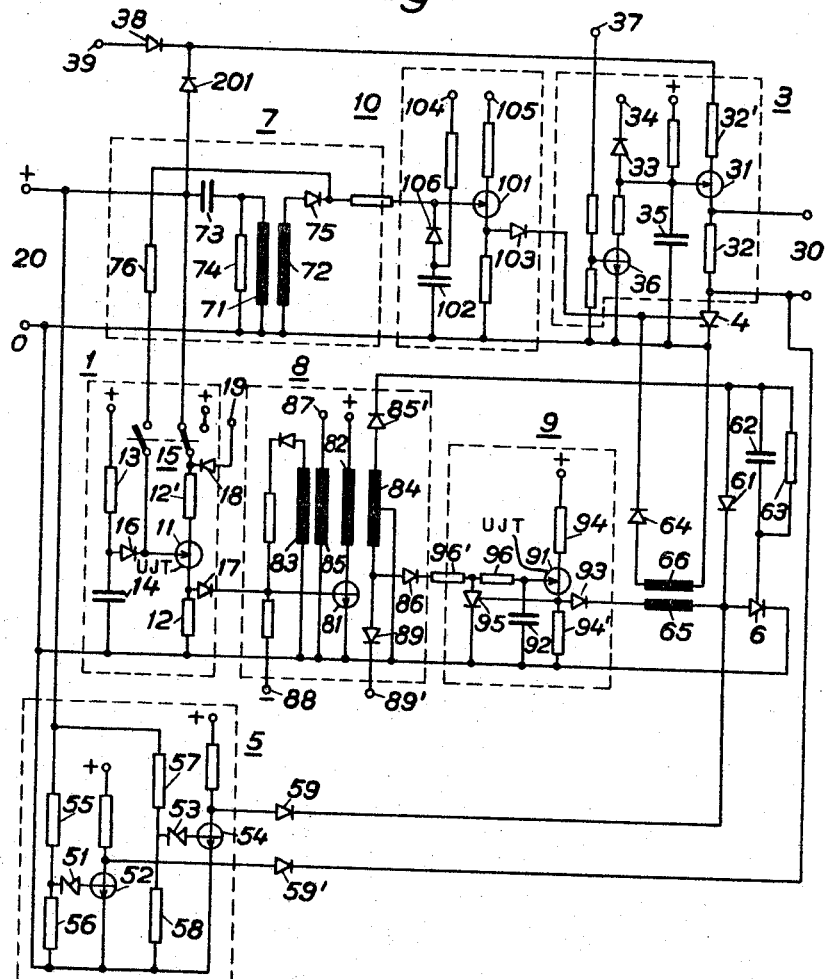

United States Patent Office 3,331,990
Patented July 18, 1967

3,331,990
EARTH FAULT PROTECTION FOR DIRECT CURRENT TRANSMISSION
Arne Johansson, Ludvika, Sweden, assignor to Allmanna Svenska Elektriska Aktiebolaget, Vasteras, Sweden, a corporation of Sweden
Filed Mar. 6, 1964, Ser. No. 349,819
Claims priority, application Sweden, Mar. 21, 1963, 3,072/63
8 Claims. (Cl. 317—31)

The present invention relates to a line protection for a direct current transmission between converter stations preferably at high voltage.

As an indication for an earth fault on an electric transmission line it is usually most convenient to use the voltage in the line in such a way that a decrease of this voltage below a certain point is interpreted as an earth fault and therefore causes a line protection device to take necessary measures because of the earth fault. In a direct current transmission with a converter this simple method is less suitable, since valve faults in a converter station as well as line faults can give rise to voltage decreases of the same magnitude. In order to avoid this disadvantage it has been proposed to obtain a selective reading of line faults by a so-called derivative protection. In the event of a valve fault in an inverter station the line voltage, because of the energy stored in the reactor of the inverter station, will drop relatively slowly, while in the event of a low-ohmic line fault the voltage in the line will drop quite rapidly.

Such a form of derivative protection is usable, e.g. for an air line, which passes over regions with slight earth resistance. If however the air line passes over regions with great earth resistance or if it is a question of a transmission consisting of a combination of air lines and long underwater cables, which because of their capacitance have a large charge, the voltage derivative may upon a relatively high-ohmic earth fault be so small that the selectivity of the protection between earth fault and valve fault is poor or possibly non-existent.

The present invention is based instead on the observation that upon line faults the oscillations in the line voltage are damped in a short time, after which the line voltage obtains a fairly constant low value, while a valve fault of any kind causes a constant voltage oscillation on the line with a frequency corresponding to that of the A.C. network connected to the converter station where the valve fault occurs. The amplitude of such a voltage oscillation may hereby be very high.

A line protection device according to the invention comprises means for measuring the line voltage and a releasing means provided with time delay means. The delay time for the last-mentioned device is divided into two intervals, the first of which corresponds to the line damping time for voltage oscillations upon line fault, while the other corresponds to the period of the alternating current network connected to the transmission. The releasing means is arranged to give signal if the line voltage during the later part of the delay time has continuously been lower than a certain value. By choosing this value lower than the amplitude value of the line voltage during the oscillation occurring upon valve fault, the protection device will only give signal upon a line fault.

Suitably the arrangement is provided with a device for indicating the change in the line voltage, which device is arranged to activate the releasing means, and another device for indicating the line voltage level during the delay time of the releasing means. Said other device will practically form a kind of holding circuit for the releasing means during the later half of the delay time. As mentioned line faults as well as valve faults will give rise to voltage oscillations on the line. In the latter case, when the line is fault-free, these oscillations will as stated cause a continuous oscillation on the line fed from the alternating current side of the converter station where the fault is, at which the amplitude value of the line voltage exceeds said pre-set value, said holding influence therefore dropping off and the releasing means becoming inactive. On the other hand if there is a fault on the line itself, for example an earth fault, said oscillation will soon die out and the releasing means will be retained in operation position until the releasing signal is given.

The releasing signal for a line is suitably adapted to the measures which are to be taken upon occurrence of a fault and consists in this case suitably of an order for blocking the rectifier station or even better transferring it to inverting, whereupon the energy stored in the transmission is taken up by the rectifier station.

The voltage change which activates the protection device may either consist of a certain negative derivative of the line voltage or it consists of a decrease of the line voltage below a certain level. In the latter case the pre-set operating level should be less than that which corresponds to the stationary line voltage, which occurs during a by-pass connection of a rectifier group in order to prevent such a by-pass connection from releasing the protection. In such a case the sensitivity of the protection device may be changed but considering that such a by-pass connection may be temporary it may be inconvenient to modify the protection device for such a reason.

Figure 2:
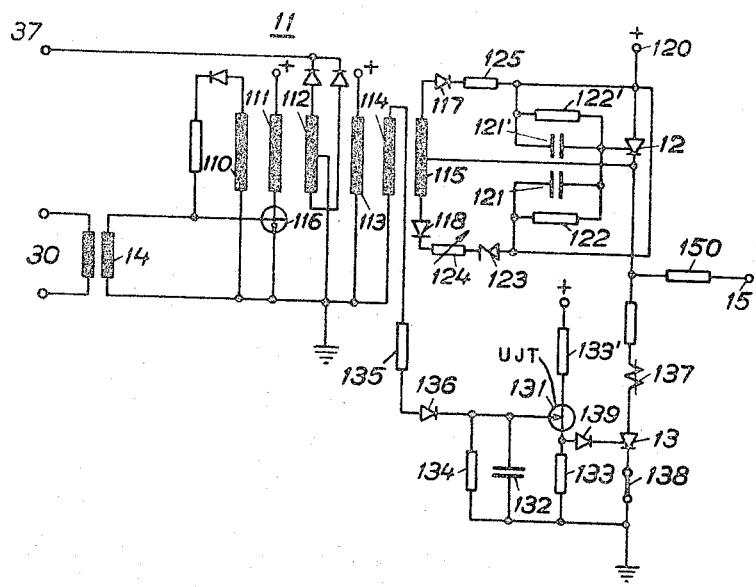

The invention will otherwise be further described with reference to the accompanying drawing, where FIGURE 1 shows an embodiment of a protection device according to the invention, while FIGURE 2 shows an additional part connected to the protection device which makes possible rapid reconnection of the rectifier station.

On FIGURE 1 two voltage sensitive means 1 and 5 are shown, influenced by a voltage proportional to the line voltage, connected to the terminals 20. The means 1 is intended to start the protection upon a certain change in the line voltage, while the means 5 is intended to indicate the line voltage during the later part of the delay time.

The protection device is provided with a time delay device 8, 9 and if the line voltage during the later part of the delay time has continuously been lower than a certain value pre-set in the means 5, the starting impulse given by the means 1 will be transmitted by two thyristors 6 and 4 to a releasing means 3.

Figure 3:
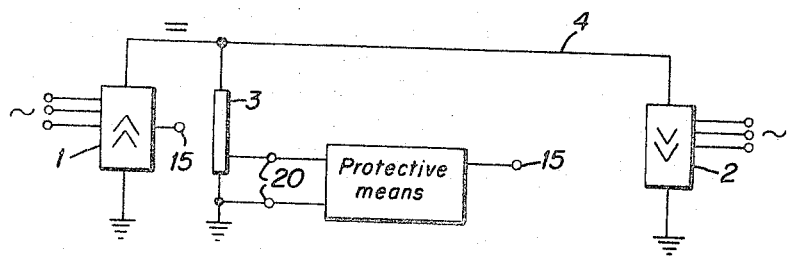

From the terminals 20 a voltage is led to the means 5, which comprises two level circuits with transistors 52 and 54 respectively. These two transistors are fed from a positive voltage source and provided in their control circuits with zener diodes 51, 53 respectively connected to corresponding voltage dividers 55, 56 and 57, 58 respectively. As long as the voltage over the terminals 20 is so high that the point of the corresponding voltage divider connected to a zener diode exceeds the zener voltage, the corresponding transistors 52 and 54 respectively will be conducting and the output voltage of the means 5 across the diodes 59 and 59' respectively will be practically zero. If on the other hand the line voltage and thereby the voltage over the terminals 20 drops below a certain value first one and then at a certain lower value also the other of the zener diodes and thereby the transistors will be blocked and the means 5 has a positive output voltage, thereby enabling the means 5 to supply holding current to one or both of the thyristors 4 and 6. FIGURE 3 shows how the protective means is connected to an HVDC transmission system.

The means 1 contains a so-called uni-junction transistor 11, the voltage circuit of which is, when the contact system 15 is in the position shown, connected in series with resistance 12, 12′ between the terminals 20, and the current circuit of which is connected across resistance 13 to a positive voltage source. Further the current circuit is parallel connected to a capacitor 14, which will be charged from said positive voltage source. If the voltage over the terminals 20 drops to a certain value the blocking voltage of the uni-junction transistor 11 will be lower than the charge voltage of the capacitor 14, the capacitor thereby will discharge itself over the uni-junction transistor. In this way a voltage pulse will be transmitted over the diode 17 to the device 8.

In order to ensure that there is always a certain control voltage over the transistor 11 the upper end of its voltage circuit is connected through a diode 18 to a limit voltage source at the terminal 19.

When the capacitor 14 has been discharged the transistor 11 will again be blocked, whereafter the capacitor 14 is again charged. If the line voltage after this charging is still low the capacitor will again be discharged over the transistor and a new voltage pulse is fed out over the diode 17, which is repeated as long as the line voltage is lower than a certain value.

Instead of influencing the means 1 and thereby the protection release device by the line voltage level, the derivative of the line voltage may be used as a fault indication.

For this object a derivating means 7 is provided, comprising a transformer, the primary winding 71 of which is connected in series with a capacitor 73 to the terminals 20. The winding 71 is further parallel connected with a resistance 74.

The secondary winding 72 is connected through a diode 75, a resistance 76 and a contact in the contact system 15 to the current circuit of the transistor 11. The contact system 15 should therefore in this case be moved over to its right hand position, in which the left hand contact is closed and the voltage circuit of the transistor 11 is connected through the right hand position of the inverter contact to a fixed positive voltage so chosen that the blocking voltage of the transistor exceeds the charge voltage of the condenser 14.

If the line voltage and thereby the voltage over the terminals 20 drops and this voltage drop has a derivative of a certain size, the capacitor 73 will be discharged through the primary winding 71 and in the secondary winding 72 a voltage pulse is induced, which exceeds the blocking voltage of the transistor 11. In this way the capacitor 14 will be discharged through the current circuit of the transistor, and as in the previous case a voltage pulse will be fed through the diode 17 into the device 8.

The voltage pulse from the diode 17 is fed into the control electrode of a transistor 81 in a blocking oscillator in the device 8. In this way this transistor will be conducting and a current from a positive voltage source flows through a winding 82 on a transformer provided with a bias winding 85 connected to a voltage source 87. The fluxes from the windings 82 and 85 are directed oppositely to each other. In this way a voltage is induced in a winding 83 of the transformer, which voltage is transmitted by a diode and a resistance to the control circuit for the transistor 81. The transistor 81 will therefore be conducting until the transformer core has become saturated. Simultaneously a voltage is induced in the winding 84, which voltage, through the diode 85′ and a thereby series-connected capacitor 62 parallel connected to a resistance 63, gives a starting impulse to the thyristor 6. When the thyristor 6 has become conducting the current from the winding 84 will go through the main circuit of thyristor through the diode 61. The oscillator 8 is so dimensioned that the voltage pulse from the winding 84 is so long that the voltage oscillations on the line during this pulse are damped in the event of a line fault. This pulse thus represents the first part of the delay time of the protection device. If the line voltage at the end of this period is less than a value preset in the means 5 the thyristor 6 will receive holding current from the means 5 through the diode 59. When the transformer has become saturated the voltage induced in the winding 83 disappears and the transistor 81 is blocked by a negative voltage 88, after which the transformer will be remagnetised by the bias winding 85. Thereby an oppositely directed voltage is induced in the winding 84 and a voltage pulse will be fed through the diode 86 to the device 9. The magnitude of this voltage is limited to a certain value by means of a voltage 89′ connected over the diode 89. The voltage pulse from 86 will charge a capacitor 92 connected in the current circuit for a uni-junction transistor 91, the voltage side of which is connected across resistances 94, 94′ to a positive voltage source. When the voltage over the capacitor 92 exceeds the blocking voltage preset in the uni-junction transistor 91 the capacitor will discharge itself through the transistor and a voltage pulse will be transmitted by the diode 93 and a winding 65 to the main circuit of the thyristor 6. The capacitor 92 is so dimensioned that its charging time at least corresponds to the period of the alternating current networks connected to the converter stations and this charging time will therefore constitute the other part of the delay time of the protection device.

If the line voltage during the whole of the charging time of the capacitor 92 has been so low that the transistor 54 has been blocked, the thyristor 6 has thus during the whole of this time been supplied with holding current over the diode 59 and said impulse from the diode 93 will go through the winding 65 and the thyristor 6 and thereby induce in the winding 66 a voltage pulse, which through a diode 64 will ignite the thyristor 4. If on the other hand in the event of a valve fault the line voltage at any time during said charging time has been above the value which corresponds to the zener voltage for the zener-diode 53, the holding current to 6 has been broken and this thyristor blocked so that the impulse from the device 9 cannot pass said thyristor.

In order to avoid a recharging of the capacitor 92 after the device 9 has given its impulse the capacitor 92 has been parallel-connected with a thyristor 95 controlled by the output pulse from the device 9. Remaining energy from the winding 84 will therefore discharge itself over the thyristor 95. If this was not the case the capacitor 92 would receive a new and uncontrolled charge which might remain as an initial charge the next time the protection device functions. In this way the charging time for the capacitor 92 and thereby the other part of the operating time of the protection device would be shortened in uncontrolled way.

The means 3 is a peak impulse generator of the same type as 1, comprising a uni-junction transistor 31, the voltage circuit of which is connected through the thyristor 4 and resistance 32, 32′ to the terminals 20. The current circuit of the transistor 31 is connected across a resistance to a positive voltage source and parallel connected with a capacitor 35. The capacitor 35 will be charged from said positive voltage source and if the voltage over the terminals 20 drops so far that the voltage over the capacitor 35 exceeds the blocking voltage in the transistor 31, the capacitor 35 will discharge itself through the transistor 31, the resistance 32 and the thyristor 4. After the capacitor 35 has discharged itself the transistor 31 will be blocked until the capacitor 35 has been charged again. In this way a voltage pulse will occur over the resistance 32 and this voltage pulse is transmitted to the output terminals 30 of the protection device, which are connected to the device for blocking the rectifier station. An assumption for obtaining a release signal is thus that the line voltage during the later part of the delay time, i.e. during the charging of the capacitor 92, remains so low that the means 5 can keep the thyristor 6 conducting, so that it is possible for the device 9 to ignite the thyristor 4.

In order to obtain a defined maximum value on the charging voltage of the capacitor 35 this has been limited with the help of a voltage source 34 connected over a diode 33. In the same way the voltage over the transistor 31 has been limited to a minimum value with the help of a voltage source 39 connected to the resistance 32' over a diode 38. In order to prevent this limit voltage from occurring over the terminals 20 the diode 201 has been inserted.

Upon very serious line faults which give rise to voltage decreases will very large derivatives, for example line faults in the neighborhood of the rectifier station, it may be desirable to carry out a release directly without delay. For this object a device 10 has been connected between the devices 7 and 3. This device is constructed in about the same way as the means 1 and 3 and comprises a unijunction transistor 101, the voltage circuit of which is connected over resistances to a positive voltage source 105, while its current circuit is connected to a capacitor 102 charged to a certain voltage from a positive voltage source 104. Further the current side of the transistor 101 is connected across a resistance and the diode 75 to the winding 72 in the device 7. Upon a decrease of the line voltage with a certain high derivative, the device 7 will therefore ignite the transistor 101, after which the capacitor 102 will discharge itself through the diode 106 over the transistor. In this way the device 10 through diode 103 will ignite the thyristor 4, upon which is mentioned earlier the means 3 will give a pulse over the terminals 30.

In direct current transmission the signal from the protection device consists as previously stated suitably of an order to the rectifier station regulator for converting to inverter operation, in order as quickly as possible to get the transmission current down to zero and thereby get the faulty point deionised. Since by means of such a measure it is often possible to remove the fault, it is desirable thereafter as quickly as possible to start the transmission again, and the output signal of the device is therefore suitably adapted to such a step.

Such a temporary blocking and rapid reconnection is carried out suitably with the arrangement shown in FIGURE 2, which is inserted between the terminals 30 in FIGURE 1 and the regulator of the rectifier station.

FIGURE 2 shows a blocking oscillator 11 of the same type as in the device 8. The oscillator comprises a transformer with a bias winding 113 and a primary winding 111 in series with a transistor 116. This is started by the pulse from the terminals 30, which is transmitted over an insulating transformer 14. When the transistor 116 has become conducting a current will grow up in the winding 111, upon which a flux is generated opposite to that generated by the bias winding 113. Hereby a voltage is induced in the winding 110 which gives continued control voltage for the transistor 116 until the transformer core has become saturated. Thereafter the transistor 116 is blocked and the transformer core is remagnetised by the biasing.

During magnetising of the transformer a voltage pulse is induced in the winding 115 which in the first place, through the diode 117, resistance 125, capacitor 121', ignites a thyristor 12 and thereafter generates a current in the main circuit of this. During remagnetising of the transformer an oppositely directed voltage is induced in the winding 115 which, through the diode 118, a variable resistance 125, a zener diode 123 and the capacitor 121, supplies ignition voltage and thereafter holding current to the thyristor 12. During the whole period in which voltage is induced in the winding 115 the thyristor 12 will therefore be conducting. In order to produce rectangular form on the other half period of said voltage the zener diode 123 is provided. Further the length of this half period may be varied with the help of the resistance 124. The capacitors 121 and 121' are provided with discharging resistances 122 and 122' respectively.

The output terminal 15 of the arrangement is connected to the regulator of the rectifier station and during the time that the thyristor 12 is conducting a positive voltage from a voltage source 120 will be connected to the terminal 15 over a resistance 150. During this time the rectifier station will be blocked or transferred to inverter operation and the line will thus be blocked.

The oscillator 11 is so dimensioned that said blocking time ensures deionising at the place of a possible fault. After said time the thyristor 12 will be blocked, since the resistance 150 is so great that the voltage source 120 is not capable of driving a holding current for the thyristor through it. The positive output voltage on the terminal 15 will therefore disappear and the rectifier station will be transferred to normal operation, i.e. reconnection occurs.

As a blocking interval for the transmission one could possibly have used only the first half period of the voltage generated in the winding 115, but by rectifying and using the whole period smaller dimensions of the oscillator transformer are obtained for a given blocking time.

During the blocking time of the transmission the means 3 is also blocked from the oscillator 11 through a positive rectified voltage induced in the winding 112. This voltage is fed to the terminal 37 in the means 3 and gives thereby a control voltage to a transistor 36 in the means 3, which transistor short-circuits the capacitor 35 and thereby prevents charging of this. At the end of the blocking time the voltage on the terminal 37 disappears, the transistor 36 is blocked and the capacitor 35 is charged at the same time as the line voltage grows up. The capacitor 35 is chosen in relation to the charging circuit so that the line voltage, if the line has been fault-free, grows more quickly than the capacitor voltage. At a certain time, namely when the line voltage has become so high that the transistor 52 in the means 5 is conducting, the holding current over the diode 59' to the thyristor 4 will in this case disappear. The capacitor 35 will be charged to the value given by the voltage 34, but no discharging is possible, since the discharging circuit over the unti-junction transistor 31 and the thyristor 4 has now been blocked. No new blocking order will thus be given to the rectifier, but the means 3 is prepared with the capacitor 35 charged in the event of a new fault.

If the line has not been fault-free during the blocking of the rectifier the line voltage will not rise to normal value and the thyristor 4 will continue to receive holding current and when the capacitor 35 has been charged a new blocking order will be given over the terminals 30 and the oscillator 11. The new blocking will as described earlier be followed by a new reconnection, etc.

If the line fault is still present after a certain number, for example two to three blockings and reconnections, the line should be permanently blocked, which occurs with the help of a thyristor 13. For controlling this the oscillator 11 is provided with a winding 114, in which a voltage is induced which through a resistance 135 and a diode 136 charges a capacitor 132. This is arranged to discharge itself over the current circuit in a uni-junction transistor 131, the voltage circuit of which is connected over resistance 133, 133' to a positive voltage source. The capacitor 132 is so large that its voltage reaches the blocking voltage preset in the transistor 131 after the desired number of blockings and reconnections of the rectifier station. When the capacitor voltage exceeds said blocking voltage the capacitor 132 will be discharged over the transistor 131 and an ignition pulse will be delivered over the diode 139 to the thyristor 13. This occurs for example in the middle of a blocking of the transmission when the thyristor 12 is conducting, and the thyristors 12 and 13 will therefore receive permanent holding current from the terminal 120, the terminal 15 receives positive voltage and the transmission is permanently blocked. The capacitor 132 thus obtains the character of a counter element. It is provided with a discharging resistance 134 which is however so great that the discharging during the temporary reconnections is negligible.

In series with the thyristor 13 an alarm transmitter is suitably arranged, for example a relay 137. In the same circuit a device should also be present, for example a breaking contact 138 for cancelling the blocking order to the terminal 15 when the line fault has been relieved.

FIGURE 3 shows a D.C. transmission line 4 connecting two converter stations 1, 2 each connected to an A.C. network. Between the line 4 and earth is inserted a voltage divider 3 and at terminals 20 the protection means according to FIGURE 1 is connected to a voltage proportional to the line voltage. In FIGURE 3 the station 1 could be the rectifier station provided with a blocking terminal 15 corresponding to the terminal 15 in FIGURE 2. Further, each of the stations may comprise in a way known per se a number of converter equipments series connected on their D.C. sides and parallel connected on their A.C. sides.

The protection according to the invention thus allows selectivity between line faults and valve faults as well as possibilities for reconnection and repeated blocking upon permanent line faults.

I claim:

1. A high voltage D.C. power transmission system provided with a protection means for detecting line faults which is characterised by first and second voltage sensitive means the inputs of which are connected to the voltage of the transmission line, the first voltage sensitive means being responsive to a certain decrease of the line voltage and the second voltage sensitive means being responsive to a line voltage below a predetermined low line voltage level, a two stage delay means connected to said first voltage sensitive means, to receive a signal therefrom, the first stage of said delay means including means to produce a delay corresponding to the damping time for a voltage oscillation occurring in the transmission line, the second stage including means responsive to the output from the first stage to produce a time delay corresponding to the period of an A.C. network connected to a converter station of the system, an output stage of said protection means including means to initiate a corrective action on the occasion of a line fault, a switching means connecting said output stage to said second delay stage, said switching means including means responsive to the output of said first delay means to render said switching means operative at least at the end of the delay produced by the first delay means to connect the output stage to the second delay means, said switching means including holding means normally operative to maintain such connection during the delay produced by the second delay means, and means connected to the second voltage sensitive means and to the holding means to render the holding means inoperative in response to an increase in line voltage above said predetermined low line voltage level.

2. A transmission system according to claim 1, in which the first voltage sensitive means includes means responsive to the time derivative of the line voltage.

3. A transmission system according to claim 2, in which means is provided to by-pass connect the delay device and said switching means in response to an increase of the time derivative of the line voltage above a certain value.

4. A transmission system according to claim 1, in which the first voltage sensitive means includes means responsive to the magnitude of the line voltage.

5. A transmission system according to claim 4, in which the voltage change required to release the first voltage sensitive means is greater than the voltage drop which occurs when a rectifier group in a converter station is by-pass connected.

6. A transmission system according to claim 1, in which the first voltage sensitive means includes means responsive to the time derivative and means responsive to the magnitude of the line voltage, switch means for selectively actuating said responsive means, and means sensitive to said time derivative to by-pass connect said first delay device and said switch means when the time derivative exceeds a certain value.

7. A transmission system according to claim 1, pulse-generating means for delivering a blocking pulse of a certain predetermined length to the rectifier station of the system in response to actuation of the output stage after the second delay.

8. A transmission system according to claim 7, in which means is provided responsive to a certain number of blockings and reconnections of the rectifier station for permanently blocking the line.

References Cited

UNITED STATES PATENTS 3,227,940 1/1966 Gilbert et al. _____ 317—31 X
3,243,658 3/1966 Blackburn _____ 317—31

MILTON O. HIRSHFIELD, *Primary Examiner.*

R. V. LUPO, *Assistant Examiner.*